United States Patent
Selby

(10) Patent No.: US 7,415,422 B1
(45) Date of Patent: Aug. 19, 2008

(54) METHOD FOR PREDICTION OF MATERIALIZATION OF A RESERVED PURCHASE

(75) Inventor: David A. Selby, North Boarhunt Near Fareham (GB)

(73) Assignee: International Business Machines Corporation, Armonk, NY (US)

(*) Notice: Subject to any disclaimer, the term of this patent is extended or adjusted under 35 U.S.C. 154(b) by 1469 days.

(21) Appl. No.: 09/628,400

(22) Filed: Aug. 1, 2000

(51) Int. Cl.
*G06F 17/30* (2006.01)
*G06Q 10/00* (2006.01)
*G06Q 20/00* (2006.01)

(52) U.S. Cl. .................. 705/10; 705/5; 705/16
(58) Field of Classification Search ............ 705/8, 705/10, 5, 6, 16; 701/202; 340/825.28
See application file for complete search history.

(56) References Cited

U.S. PATENT DOCUMENTS

| | | | | |
|---|---|---|---|---|
| 4,775,936 | A * | 10/1988 | Jung | 705/5 |
| 5,191,523 | A * | 3/1993 | Whitesage | 705/6 |
| 5,255,184 | A | 10/1993 | Hornick et al. | 364/407 |
| 5,270,921 | A | 12/1993 | Hornick | 364/407 |
| 5,652,867 | A | 7/1997 | Barlow et al. | 395/500 |
| 5,832,454 | A | 11/1998 | Jafri et al. | 705/6 |
| 5,918,209 | A | 6/1999 | Campbell et al. | 705/5 |
| 6,078,891 | A * | 6/2000 | Riordan et al. | 705/10 |
| 6,253,187 | B1 * | 6/2001 | Fox | 705/10 |
| 6,263,315 | B1 * | 7/2001 | Talluri | 705/8 |
| 6,298,348 | B1 * | 10/2001 | Eldering | 707/10 |

OTHER PUBLICATIONS

Jovin, Ellen, "Buckling up the business traveler", American Demographics, Ithica, Dec. 1998, v20, Issue 12, p. 48-52.*
Kitahara, Yoji, "Travel Monitor: Japanese travellers' needs changing fast", The Bangkok Post, Bangkok, Dec. 20, 1999, p. 1.*
U.S. Appl. No. 09/628,398, filed Aug. 1, 2000, Inventor: David A. Selby.*
U.S. Appl. No. 09/628,399, filed Aug. 1, 2000, Inventor: David A. Selby.*
L. R. Weatherford & S. E. Bodily, A Taxonomy and Research Overview of Perishable-Asset Revenue Management: Yield Management, Overbooking, and Pricing, 40 Operations Research 5, pp. 831-844 (1992).
U.S. Appl. No. 09/628,398, filed Aug. 1, 2000, Inventor: David A. Selby, "Method and System for Prediction of Materialization of a Group Reservation".
U.S. Appl. No. 09/628,399, filed Aug. 1, 2000, Inventor: David A. Selby "Method and System for Management of a Wait List for Reserved Purchases".

* cited by examiner

*Primary Examiner*—Joseph Thomas
*Assistant Examiner*—Rachel L Porter
(74) *Attorney, Agent, or Firm*—Saul Ewing LLP; John R. Pivnichny

(57) ABSTRACT

The present invention provides a method for predicting the likelihood of materialization of pending reservations for the purchase of perishable commodities. Details pertaining to perishable commodities for which reservations for purchase have been made in the past, are gathered and analyzed as are details pertaining to perishable commodities for which reservations for purchase are currently pending. Based upon the analysis, the likelihood that a particular pending reservation will actually be purchased or "materialize" is determined and this information is utilized for yield management.

13 Claims, 4 Drawing Sheets

METHOD FOR PREDICTION OF MATERIALIZATION OF A RESERVED PURCHASE

BACKGROUND OF THE INVENTION

1. Field of the Invention

This invention relates generally to purchasing and reservation systems and, in particular, the present invention relates to improvement of yield management with respect to perishable commodities such as airline seats, hotel rooms and the like.

2. Description of the Related Art

Common carriers such as commercial buses, trains, and airlines, and service industries such as hotels and rental car companies, face complex issues when conducting strategic and operational planning. Businesses of this type deal with "perishable commodities" which are defined as commodities that cannot be inventoried and share three common characteristics: perishability, "fixed" capacity, and segmentability. Perishability means that each commodity ages or becomes unavailable, and thus has no value, after a certain date, time or similar temporal event. "Fixed" capacity implies a high cost of adding an incremental unit such that capacity is regarded as static and unchanging. Segmentability refers to the ability to segment customers based on a willingness to pay using different rates and/or different purchase restrictions, such as the date of purchase relative to the date of use. Examples of perishable resources include airline seats, hotel room nights, rental car days and similar products or services such as described in L. R. Weatherford & S. E. Bodily, A Taxonomy and Research Overview of Perishable-Asset Revenue Management Yield Management, Overbooking, and Pricing, 40 Operations Research 5, pp. 831-44 (1992), the disclosure of which is incorporated herein by reference.

Organizations marketing and selling perishable commodities spend numerous hours trying to choreograph the interrelated elements of scheduling, routing, and crew/staff rotations while maximizing profits and efficiency. Maximum profits are achieved when all of the available perishable commodities (e.g., with respect to airlines, all seats on a given flight) are sold on the perishing date (e.g., with respect to airlines, at the time the given flight departs). Maximum customer satisfaction occurs when perishable commodities reserved by consumers are available on the perishing date. The marketer/seller of perishable commodities must therefore constantly balance these two competing interests so that all of the commodities are sold and are available for all those who reserved them.

The terms "revenue management" and "yield management" are now common terms in service industry parlance to describe the use of statistical analysis to manage itinerary control, inventory control, over-booking and pricing so as to increase the revenue yield per unit of available capacity. Based on the statistical analysis, forecasting, optimization models, and the like, determinations are made as to which reservation requests to accept and which to reject in order to maximize revenues.

The airline industry presents a typical example of a service industry which utilizes yield management techniques to try to maximize profits while coping with the complicated operational issues inherent to the industry. An airline passenger may have five or more carriers to choose from when planning a trip from point A to point B. Airlines are constantly seeking ways to maximize their efficiency and profits and make tremendous efforts to win and maintain customer loyalty. Airline passengers' primary criteria in selecting airlines include safety, comfort, and timeliness. Given the relatively wide selection of carriers available to airline passengers, and the ease with which reservations can be made and changed, a failure in any of these areas by an airline is likely to result in a migration of passengers to other airlines.

It is a well-known practice in the airline industry to overbook flights in an attempt to assure that the flights are fully loaded with passengers, thereby maximizing the profits for the airlines. The policy of overbooking is based upon practical considerations. For various reasons, not all flights reserved are actually purchased, i.e., while they may have been reserved, they do not actually "materialize". For example, air travelers frequently reserve seats which they have no intention of using so that they may be assured of having the most convenient itinerary possible. Take, for example, an air passenger who is based in Philadelphia and needs to be in London, England on a particular Tuesday by 1 p.m. The passenger might reserve a first itinerary comprising a direct flight from Philadelphia to London on British Airways, arriving in London at 12:30 p.m. on Tuesday; a second itinerary comprising a first leg from Philadelphia to John F. Kennedy Airport in New York on American Airlines and a second leg from John F. Kennedy Airport to London via British Airways, arriving in London at 11:30 a.m. on the same Tuesday; and a third itinerary comprising a first leg from Baltimore/Washington International Airport to Dulles Airport in Washington, D.C., and a second leg from Dulles Airport to London, arriving in London, again, on the same Tuesday at 10:00 a.m., both legs being on U.S. Airways. Clearly, the passenger can only use one of the itineraries; however, for convenience sake, the user may wait until the last minute to decide which of the three itineraries to utilize, and the user may or may not proactively cancel the two unused (i.e., unmaterialized) itineraries.

Similarly, the passenger may not know with any certainty what time he or she will be able to leave London on a return flight. For example, suppose that the passenger is traveling to London on business and will be a conducting meeting having an unknown duration. The passenger may reserve several outgoing flights spaced several hours apart so as to be assured of having a reservation on a flight leaving within a reasonably short time after the conclusion of the business meeting.

While providing convenience for the air passenger, such reservation practices make it particularly difficult for airlines to assure that all flights depart without empty seats. To compensate for unmaterialized reservations, airlines have adopted the policy of overbooking flights with the understanding that a certain percentage of the seats on "reserved" status by passengers will never actually materialize. In a perfect world, the airlines could always tell with precision precisely how many passengers would over-reserve for a particular flight and would then overbook for that flight by the exact number so that all seats would be filled. In reality, however, it is impossible to predict precisely how may reservations will not materialize; thus, airlines frequently end up with either too few seats sold, thereby losing revenues by flying aircraft with empty seats, or too many seats sold, requiring the airlines to "bump" passengers onto the next available flight to their destination. While most airlines will in some manner compensate passengers that have been bumped, for example, by providing them with vouchers good towards future flights on the airline, free hotel accommodations, and the like, such a practice, is costly for the airlines, is usually extremely inconvenient to the airline traveler, and can lead to once-loyal passengers migrating to a competitor airline.

In an attempt to overcome the above problems, systems have been developed which track the frequency with which a particular flight experiences overbooking or underbooking and, based on this statistical analysis, increases the point at which that particular flight is considered "closed" to a number greater than 100% of the capacity of the aircraft, with the exact percentage greater than 100% being based upon the historical data for that flight. Examples of such systems can be found in, for example, U.S. Pat. No. 5,918,209 to Campbell et al., U.S. Pat. No. 5,255,184 to Hornick et al., and U.S. Pat. No. 4,775,936 to Jung, all of which are incorporated fully herein by reference.

Each of the prior art systems known to the applicant involve statistical analysis of the perishable commodity in question (e.g., the particular flight, airline seat, hotel room, rental car) to determine the history of booking with respect to the perishable commodity over a period of time. Thus, for example, a particular flight (e.g., Flight Number 250 from Philadelphia to London) and/or combination of legs comprising an entire itnerary, might be analyzed to determine the likelihood that the particular flight(s) will be fully sold out, based on the overall past history of overbooking or underbooking for the flight(s). Additional factors considered by the prior art systems may include whether or not a particular event is associated with the flight (e.g., did a particular flight experience different sales characteristics when the flight was associated with travel to and from the Olympic Games?), or whether any sales promotions are associated with the flight (e.g., was it necessary to offer discounted fares in order to fill up the seats?). While the use of such systems provides assistance to the airlines, their focus is always on very general statistical history of a specific booking itself, and guesses regarding the impact of outside factors such as event association or promotional fare structures.

None of the prior art systems analyze: details of the individual reservations so that the reservations can be characterized as having one or more traits; characteristics of the consumers who reserve the bookings so that the consumers (or potential consumers) can be characterized as having one or more traits; or the reasons why the person making the reservation actually did (or did not) purchase the reserved booking. The Applicant has determined, however, that it is only by understanding why a particular booking actually materializes that better prediction models can be developed so as to optimize the yield management or revenue management system. If the details of the booking (other than simply the flight number) and characteristics of the persons making the reservations were to be factored into the analysis, the effectiveness of the overbooking policy by the airlines could be increased. However, none of the prior art systems attempt to make such an analysis.

Accordingly, it would be desirable to have a method and system for gathering and storing information about prior reservations, details of the perishable commodity reserved, and characteristics related to the person making the reservation, and using this information to determine, with more precision than is available in the prior art, the likelihood that current pending reservations will materialize.

SUMMARY OF THE INVENTION

It is therefore an object of the invention to provide a system and method for predicting the likelihood of materialization of pending reservations for the purchase of perishable commodities, which system and method provides for the gathering and analysis of details pertaining to perishable commodities for which reservations for purchase have been made in the past, gathering and analysis of details pertaining to perishable commodities for which reservations for purchase are currently pending, and determining, based upon the analysis, the likelihood that a particular pending reservation will actually be purchased or "materialize".

In a first embodiment of the present invention, the present invention comprises a method for materialization forecasting with respect to reservations made by individuals for the potential purchase of perishable commodities, comprising the steps of: gathering past reservation information relating to past reservations for perishable commodities that have already perished; gathering current reservation information relating to current reservations for perishable commodities that have not yet perished; comparing the past reservation information and the current reservation information; calculating the likelihood that the current reservations will materialize based on the comparison; and outputting materialization forecast results based on the calculated likelihood.

In a second embodiment of the present invention, the invention comprises computer-readable code stored on media for conducting materialization forecasting with respect to reservations made by persons for the potential purchase of perishable commodities, comprising: first subprocesses for gathering past reservation information relating to past reservations for perishable commodities that have already perished, second subprocesses for gathering current reservation information relating to current reservations for perishable commodities that have not yet perished, third subprocesses for comparing the past reservation information and the current reservation information, fourth subprocesses for calculating, based on the comparison, the likelihood that the current reservations will materialize, and fifth subprocesses for outputting materialization forecast results based on the calculated likelihood.

DETAILED DESCRIPTION OF THE PREFERRED EMBODIMENTS

Figure 1:
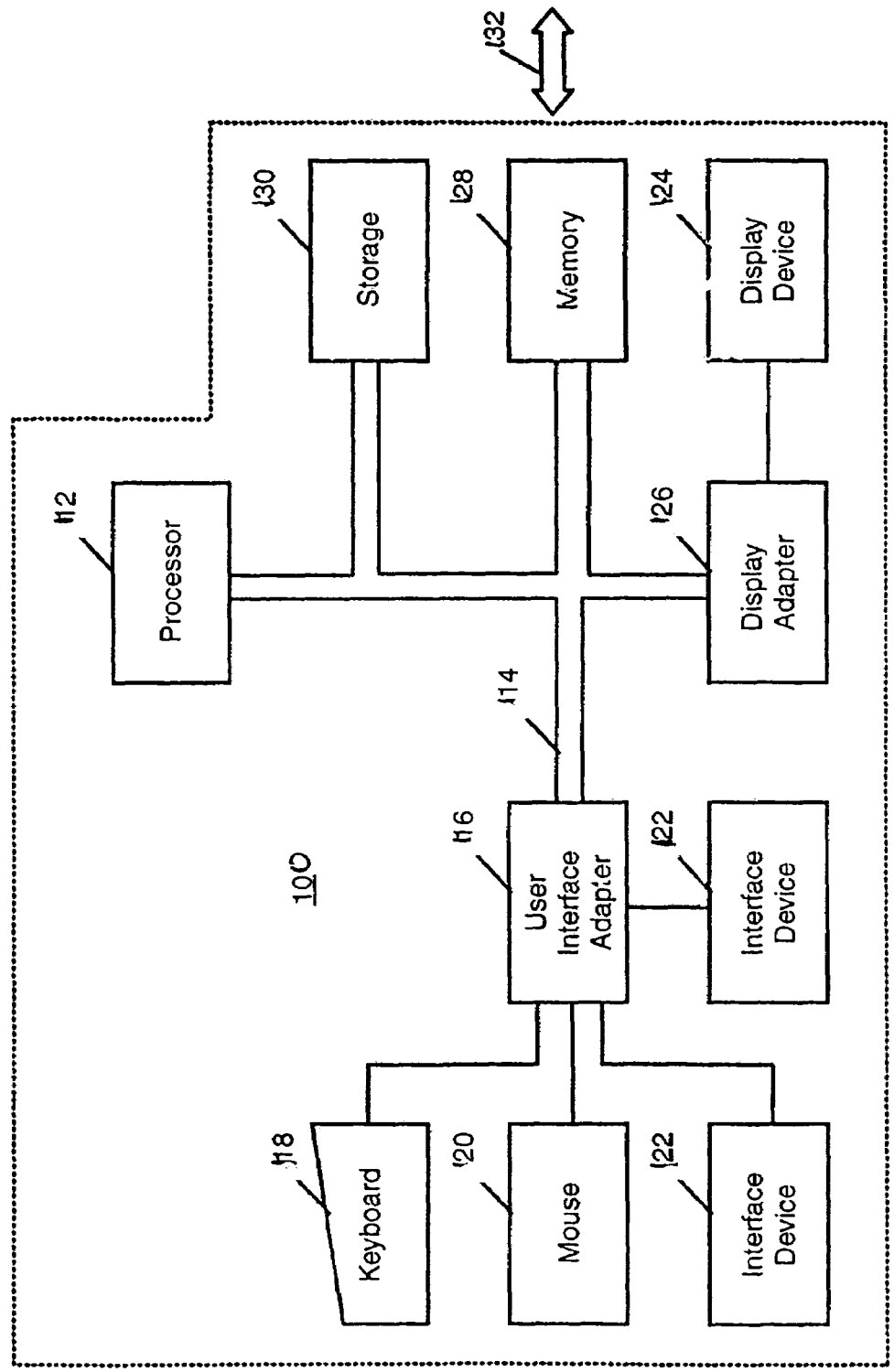
FIG. 1 illustrates a representative workstation hardware environment in which the present invention may be practiced.

In the following detailed description of the preferred embodiments, references made to the accompanying drawings which form a part hereof, and in which is shown by way of illustration, an embodiment in which the invention may be practiced. It is understood that other embodiments may be utilized, and changes may be made to both that process and the structure without departing from the scope of the present invention.

As used herein, the following terms have the following meanings:

Flight Leg—used in the context of airline travel to describe a single flight segment comprising a take-off from a departure point through the immediately-following landing at a destination point.

Itinerary—the sequential outline of a trip or other sequence of events, or a proposed trip or sequence of events. For example, in the context of airline travel, the term "Itinerary" describes the sequence of flight legs beginning at the originating (i.e., the first) departure point and ending at the ultimate (i.e., final) destination point. An airline travel itinerary can be "one-way" or "roundtrip" using the ordinary and customary meaning of these terms. An itinerary with respect to hotel travel would be the sequence of nightly hotel stays in a particular trip, beginning with the first stay and ending with the last.

Demographic Information—statistical characteristics of a population; in connection with the present invention, the demographic information pertains to statistical characteristics relating to consumers of perishable commodities including, without limitation, the age, gender, national origin, citizenship, country of residence, occupation, annual income, marital status, and frequency of purchase (of the perishable commodity) of the consumer.

Commodity Details—narrow, detailed information pertaining to a commodity; for example, commodity details in connection with an airline seat include, without limitation, carrier name, flight origin, flight destination, booking class, flight distance, departure time, connection time, arrival time, departure date, arrival date, flight duration, number of distinct legs comprising a complete one-way itinerary, aircraft type, aircraft capacity.

Point-of-Sale (POS) Information—statistical information available from the location where the sale of the commodity occurred. This information may include, without limitation, POS type (travel agent, direct sale, etc.), POS country, booking carrier, booking recency (e.g., number of days since booking made), change recency (e.g., number of days since booking last changed), fare code, number of passengers traveling with the consumer making the reservations, length of stay associated with the reservation, time between booking date and flight date, payment status.

Materialization Information—statistical information identifying a reservation as having either materialized or not materialized.

Past Reservation Information—commodity details, demographic information, POS information and/or materialization information relating to past reservations for perishable commodities that have already perished. Upon expiration (perishing) of the commodity, the information pertaining thereto becomes past reservation information because it then relates to reservations that can no longer be filled.

Current Reservation Information—commodity details, demographic information, and/or POS information relating to current (i.e., pending) reservations for perishable commodities. Upon expiration (perishing) of the commodity, the current reservation information becomes past reservation information because it then relates to reservations that can no longer be filled.

FIG. 1 illustrates a representative workstation hardware environment in which the present invention may be practiced. The environment of FIG. 1 comprises a representative single user computer workstation 100, such as a personal computer, including related peripheral devices. The workstation 100 includes a microprocessor 112 and a bus 114 employed to connect and enable communication between the microprocessor 112 and the components of the workstation 100 in accordance with known techniques. The workstation 100 typically includes a user interface adapter 116, which connects the microprocessor 112 via the bus 114 to one or more interface devices, such as keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long term storage 130 which can include a hard drive, tape drive, etc.

The workstation 100 communicates via a communications channel 132 with other computers or networks of computers. The workstation 100 may be associated with such other computers in a local area network (LAN) or a wide area network, or the workstation 100 can be client in a client/server arrangement with another computer, etc. All of these configurations, as well as the appropriate communications hardware and software, are known in the art.

Figure 2:
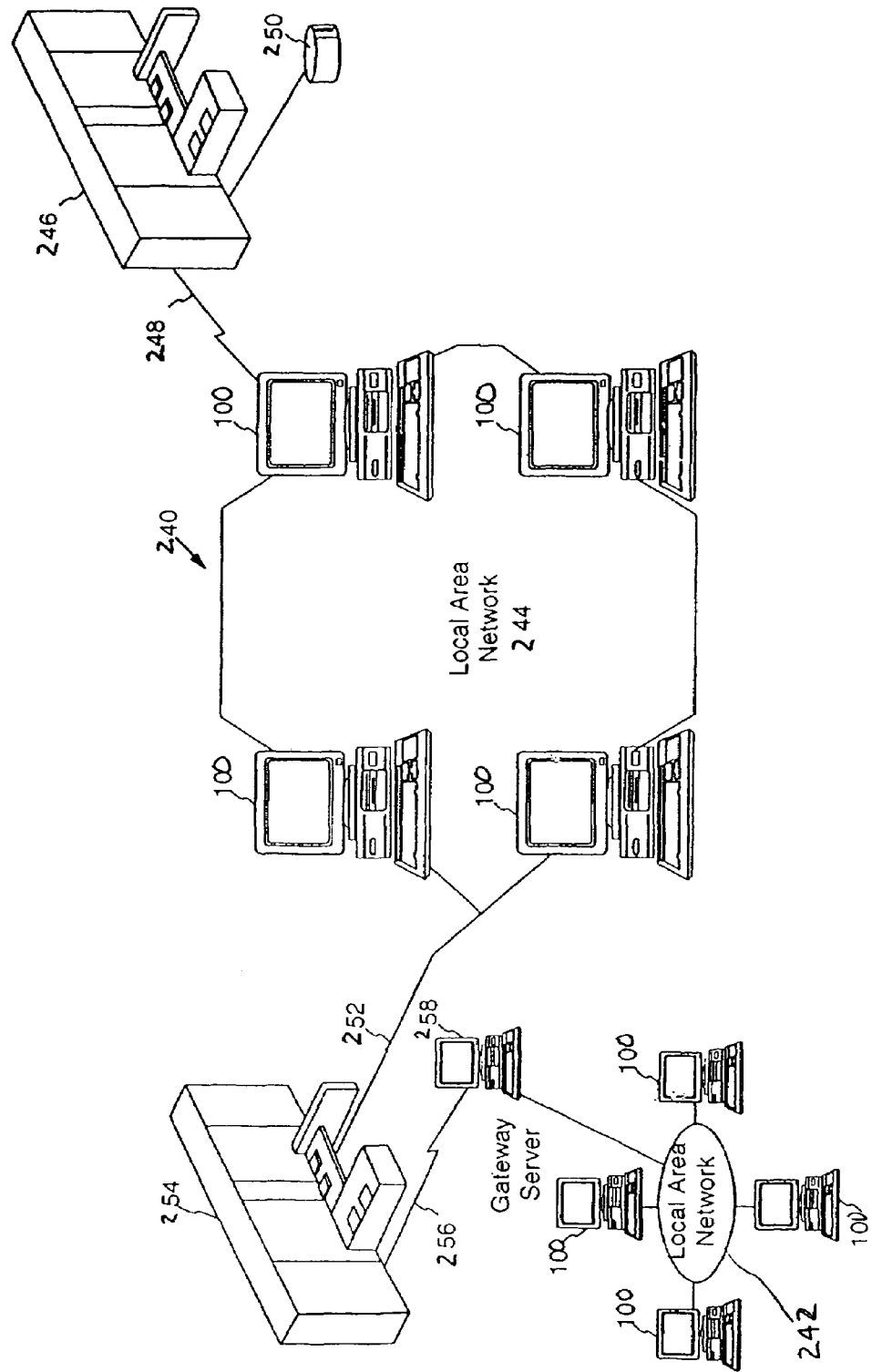
FIG. 2 illustrates a data processing network in which the present invention may be practiced.

FIG. 2 illustrates a data processing network 240 in which the present invention may be practiced. The data processing network 240 includes a plurality of individual networks, including LANs 242 and 244, each of which includes a plurality of individual workstations 100. Alternatively, as those skilled in the art will appreciate, a LAN may comprise a plurality of intelligent workstations coupled to a host processor.

Still referring to FIG. 2, the data processing network 240 may also include multiple mainframe computers, such as a mainframe computer 246, which may be preferably coupled to the LAN 244 by means of a communications link 248. The mainframe computer 246 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 246 may also be coupled to a storage device 250, which may serve as remote storage for the LAN 244. Similarly, the LAN 244 may be coupled to a communications link 252 through a subsystem control unit/communication controller 254 and a communications link 256 to a gateway server 258. The gateway server 258 is preferably an individual computer or intelligent workstation which serves to link the LAN 242 to the LAN 244.

Those skilled in the art will appreciate that the mainframe computer 246 may be located a great geographic distance from the LAN 244, and similarly, the LAN 244 may be located a substantial distance from the LAN 242. For example, the LAN 242 may be located in California, while the LAN 244 may be located in Texas, and the mainframe computer 246 may be located in New York.

Software programming code which embodies the present invention is typically stored in permanent storage of some type, such as the permanent storage 130 of the workstation 100. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention will now be discussed with reference to FIGS. 3-4.

Figure 3:
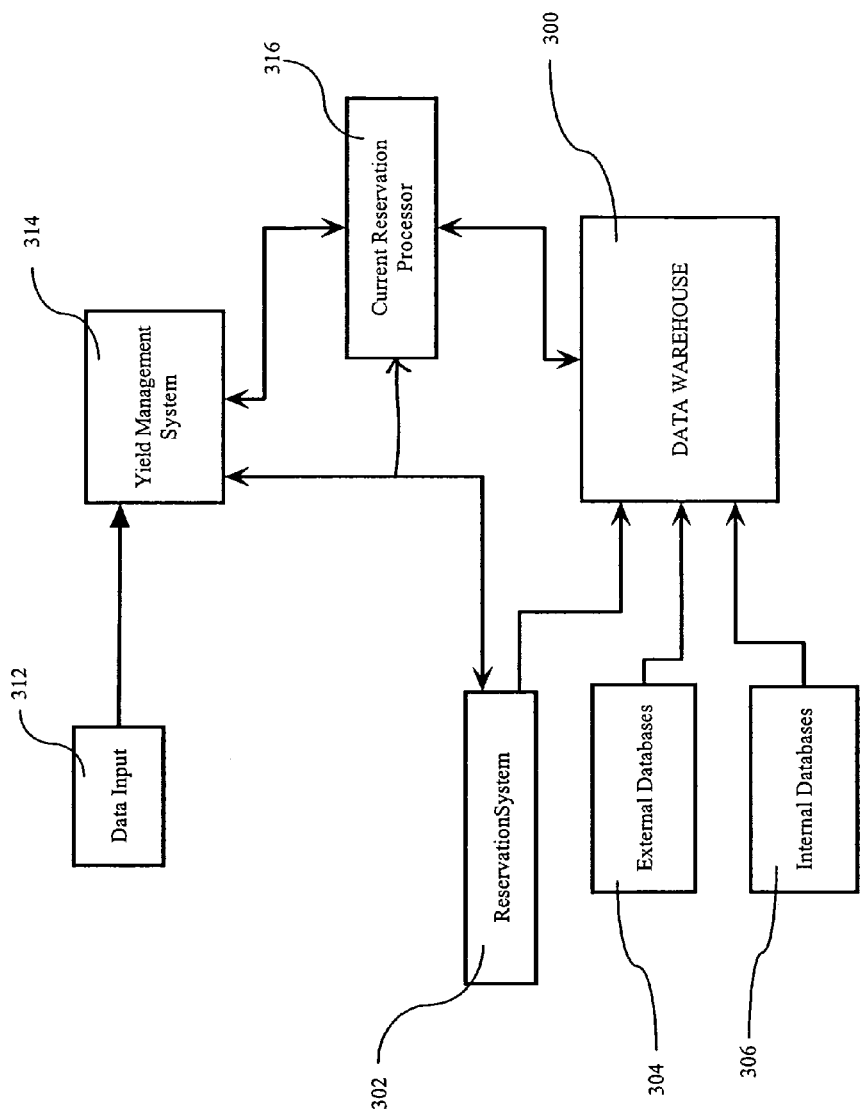
FIG. 3 is a block diagram of an exemplary embodiment of a system constructed in accordance with the present invention.

FIG. 3 is a block diagram of an exemplary embodiment of a system constructed in accordance with the present invention. As shown in FIG. 3, a data warehouse 300 stores reservation information, both past and current. The reservation information can be directed to data warehouse 300 from any known source, for example, from a reservation system 302 or from external or internal databases 304 and 306. External databases 304 and internal databases 306 are simply "reservoirs" of pertinent data which contain data of interest. Internal databases are kept by an organization for many purposes, e.g., frequent flyer information and marketing information might be kept in an internal database by an airline. External databases are maintained by private outside sources such as travel agents and data-gathering companies and typically the information they contain is sold to the using organization for profit, e.g., demographic information is often solicited by a private data-gathering organization in exchange for prizes or contest-entries, and the information obtained is then sold to an end user.

The data warehouse 300 may be updated on a real time basis, i.e., as new reservations are made, data regarding the new reservation is immediately stored in the data warehouse 300 so it is immediately available for use in analysis and/or modeling. The new reservation information (e.g., passenger information, flight information, etc. related to a reservation currently being made) is first input to a conventional yield management system 314 via data input 312. Data input 312 can comprise, for example, a keyboard or a server which receives data input from other sources such as the internet, an intranet, or other input source. The yield management system operates in connection with the reservation system 302 in a known manner to confirm (or deny) a reservation request after a determination is made that reservation spaces are (or are not) available taking into account the overbooking criteria established by the yield management system.

Connected between data warehouse 300 and yield management system 314 is a current reservation processor 316 which is capable of two-way communication between data warehouse 300, reservation system 302, and yield management system 314. In accordance with the present invention, the data warehouse 300 is queried by current reservation processor 316 to find past reservation information having similar characteristics to the current reservation information. Thus, in contrast to the prior art systems, which simply compares the past booking history of, e.g., Flight 250 from Philadelphia to London, the present invention examines all flights which have similar characteristics to those of the current reservation, not just Flight 250. For example, assume that over the past two years the reservations for Flight 250 from Philadelphia to London have a materialization rate of 60%. Assume further that the current reservation request for Flight 250 being processed by current reservation processor 316 is for a non-stop, Philadelphia-to-London flight, pleasure travel, two adults and one child, one month from reservation to travel date, payment made by credit card at time of reservation, reservation made by direct contact between the consumer and the airline. Using the present invention, the data warehouse 300 is searched for all previous reservations having the same attributes, and the materialization information for all past reservations that have the same attributes is evaluated. Based on this information, if it is determined that reservations of this type have a 98% materialization rate, this factor is applied to the current reservation, using the yield management system 314 in a well-known manner. Using the prior art systems and methods, Flight 250 would be overbooked to 140% capacity to cover the historical tendency of this flight to have only a 60% materialization rate; with the present invention, however, each reservation for the current flight will be weighted based on its tendency to materialize, and a much more accurate booking will result.

Figure 4:
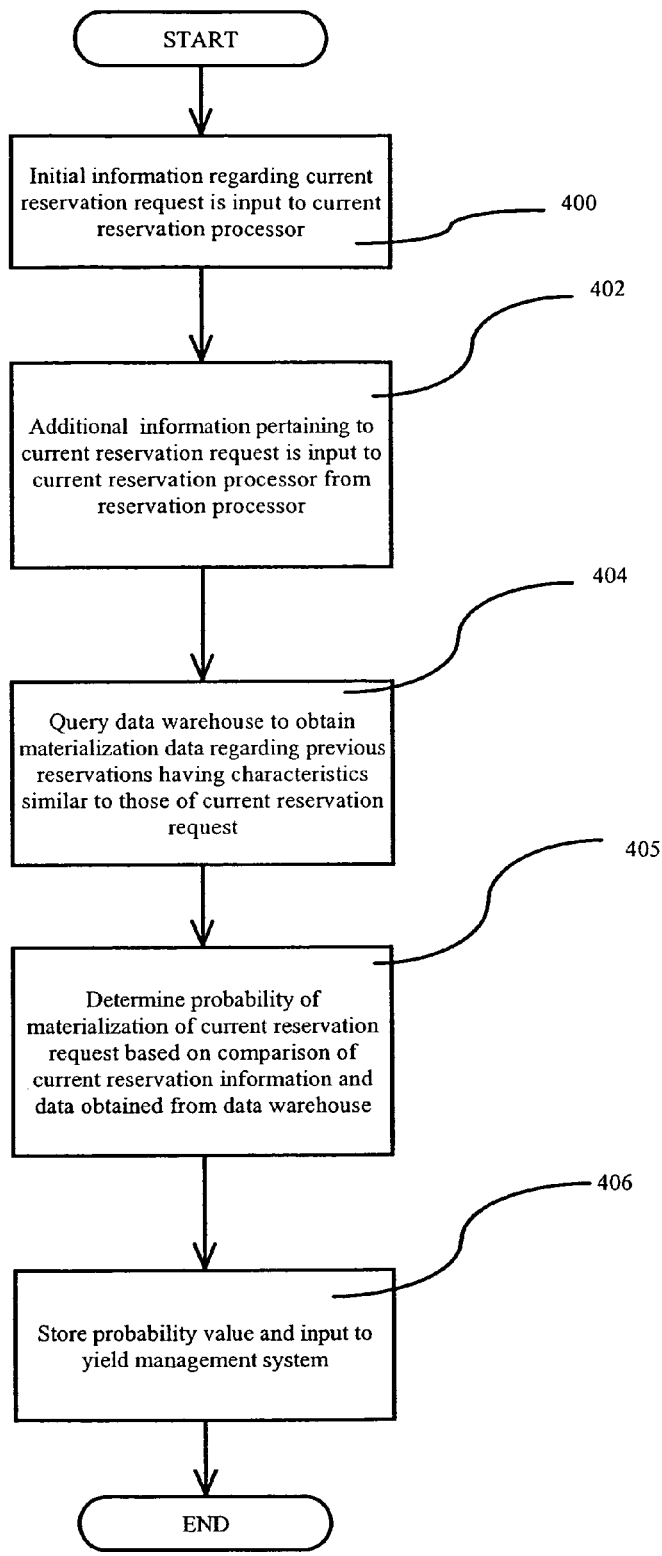
FIG. 4 is a flowchart illustrating the steps of the method of the present invention.

FIG. 4 is a flowchart illustrating the basis steps of the method of the present invention. At step 400 information regarding a current reservation request is input to the current reservation processor 316 via the yield management system 314. The information regarding the current reservation request will include the basic information given by a potential purchaser: travel date(s) and time(s); number of passengers; age categories of passengers (e.g., under 12, senior citizen, etc.); gender of passengers; departure and destination location(s); type of travel (e.g., business); payment details. Based on this information, the reservation system 302 also supplies additional information to current reservation processor 316 at step 402. This information is derived based upon the current reservation information discussed above. For example, based on the input information by the potential purchaser, the reservation system might indicate to current reservation processor 316 that Flight 250 from Philadelphia to London will satisfy the travel dates, times, departure and destination locations, etc. requested by the potential purchaser.

At block 404, the current reservation processor queries the data warehouse 300 to obtain materialization data regarding previous reservations made which possess data characteristics similar to those of the current reservation request. At block 405, based upon the comparison of the past materialization data from the data warehouse 300 and the current reservation information input at step 400, the probability of materialization for the current reservation request is determined and stored in the current transaction processor 316. Finally, at step 406, the stored information regarding the materialization probability of the current reservation request is input to the yield management system 314, which utilizes this information to authorize or deny the reservation of desired flight or flights requested by the potential purchaser.

Use of the present invention results in much greater precision in materialization forecasting than the methods and systems of the prior art. By focusing on and analyzing the individual details which cause a reservation to materialize or not materialize, the accuracy of materialization forecasting is improved and the efficiency of running operations, such as airlines, is increased significantly.

While the present invention can be used at any time and as often or as little as desired, additional benefits can be obtained by utilizing the invention at certain critical times in a reservation cycle prior to the perishing date. For example, in connection with airline reservations, it can be helpful to increase the frequency of updating the materialization information as the departure time gets closer, e.g., at departure plus 21 days, departure plus 14 days, departure plus 7 days, departure plus 4 days, etc. Having this updated information would allow the airline to make adjustments as needed, such as by discounting fares to make sure reservations that became unmaterialized at the last minute can be sold or by adding additional flights to a schedule if warranted. Further, by obtaining updated materialization information at departure plus 2 days or on the day of departure, a clearer picture of the cash flow position for a departing flight can be gained (since reservations that are still valid at that late date are very likely to materialize and thus the airline can be relatively sure that the cash generated by the flight will become a receivable).

Although the present invention has been described with respect to a specific preferred embodiment thereof, various changes and modifications may be suggested to one skilled in the art and it is intended that the present invention encompass such changes and modifications as fall within the scope of the appended claims. For instance, the example described above is directed primarily to an airline reservations system; however, it is understood that the present invention has equal application and the claims herein are intended to cover to any reservation system involving transactions related to perishable commodities. Further, while certain examples of characteristics and traits of the reservations and perishable commodities are given herein, it is not intended to limit the present invention to the gathering and analysis of these characteristics and traits; any characteristics and traits of the perishable commodities may be utilized in connection with the present invention. The programming of the present invention may be implemented by one of ordinary skill in the art of object-oriented programming.

The above-described materialization prediction system and its individually described elements may be implemented in various computing environments. For example, the present invention may be implemented on a conventional IBM PC or equivalent, multi-nodal system (e.g., LAN) or networking system. All programming, algorithms, GUIs, display panels and dialog box templates, metadata and data related thereto are stored in computer memory, static or dynamic, and may be retrieved by the user in any of: conventional computer storage, display (i.e., CRT) and/or hardcopy (i.e., printed) formats.

I claim:

1. A method, using a processing device, for materialization forecasting with respect to reservations made by persons for the potential purchase of a particular perishable commodity, comprising the steps of:
    gathering past system-wide reservation information relating to past reservations for perishable commodities that have already perished, said system-wide past reservation information including information unrelated to said particular perishable commodity;
    gathering current reservation information relating to current reservations for said particular perishable commodity, which current reservation has not yet perished;
    comparing said gathered past system-wide reservation information unrelated to said particular perishable commodity and said current reservation information using said processing device;
    calculating, based on said comparison, the likelihood that said current reservations will materialize; and
    outputting, using said processing device, materialization forecast results based on said calculated likelihood.

2. The method as set forth in claim 1, wherein said past system-wide reservation information includes historical commodity details unrelated to said particular perishable commodity.

3. The method as set forth in claim 2, wherein said past system-wide reservation information further includes Point-of-Sale (POS) information included in said past system-wide reservation information that is unrelated to said potential purchase of said particular perishable commodity.

4. The method as set forth in claim 3, wherein said past system-wide reservation information further includes materialization information unrelated to said potential purchase of said particular perishable commodity.

5. The method as set forth in claim 4, wherein said past system-wide reservation information includes demographic information about persons who made said past reservations.

6. The method as set forth in claim 5, wherein said demographic information includes one or more of the following pertaining to said persons making said past reservations: age, sex, national origin, citizenship, country of residence, occupation, education, annual income, marital status, reservation frequency.

7. The method as set forth in claim 6, wherein said current reservation information further includes current-commodity details regarding said particular perishable commodity.

8. The method as set forth in claim 7, wherein said current reservation information further includes POS information pertaining to said particular perishable commodity.

9. The method as set forth in claim 8, wherein said current reservation information includes demographic information about persons making said current reservations for said particular perishable commodity.

10. The method as set forth in claim 9, wherein said demographic information includes one or more of the following pertaining to said persons making said current reservations: age, sex, national origin, citizenship, country of residence, occupation, education, annual income, marital status, reservation frequency.

11. The method as set forth in claim 10, wherein said perishable commodities comprise airline seats, and wherein said historical commodity details include information related to one or more of the following regarding said airline seats: carrier name, flight origin, flight destination, booking class, flight distance, departure time, connection time, arrival time, departure date, arrival date, flight duration, number of distinct legs comprising a complete one-way itinerary, aircraft type, aircraft capacity.

12. The method as set forth in claim 11, wherein said POS information includes one or more of the following: POS type, POS country, booking carrier, booking recency, change recency, fare code, number of passengers traveling with said persons making said past reservations, length of stay associated with the reservation, time between booking date and flight date, payment status.

13. The method as set forth in claim 12, wherein said current-commodity details include information related to one or more of the following: carrier name, flight origin, flight destination, booking class, flight distance, departure time, connection time, arrival time, departure date, arrival date, flight duration, number of distinct legs comprising a complete one-way itinerary, aircraft type, aircraft capacity.

* * * * *